*(12)* United States Patent
Inazumi

(10) Patent No.: US 6,909,257 B2
(45) Date of Patent: Jun. 21, 2005

(54) METHOD AND DEVICE FOR CORRECTING ESTIMATED SPEED OF INDUCTION MOTOR AND ITS DEVICE

(75) Inventor: Masanobu Inazumi, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/450,675

(22) PCT Filed: Dec. 14, 2001

(86) PCT No.: PCT/JP01/10977

§ 371 (c)(1),
(2), (4) Date: Jun. 17, 2003

(87) PCT Pub. No.: WO02/50993

PCT Pub. Date: Jun. 27, 2002

(65) Prior Publication Data

US 2004/0036441 A1 Feb. 26, 2004

(30) Foreign Application Priority Data

Dec. 18, 2000 (JP) ........................................ 2000-384083

(51) Int. Cl.[7] ............................. H02P 1/26; H02P 7/36; G01P 3/00
(52) U.S. Cl. ...................... 318/727; 318/801; 318/805; 318/799; 702/147
(58) Field of Search ................................ 318/727, 432, 318/799, 798, 811, 800–806, 812, 813, 609, 610, 138, 254, 820–828; 363/13, 37; 702/142, 147, 145, 96, 105

(56) References Cited

U.S. PATENT DOCUMENTS 5,541,488 A * 7/1996 Bansal et al. ................ 318/801
5,670,854 A * 9/1997 Matsuura et al. ............ 318/432
6,281,659 B1 * 8/2001 Giuseppe ..................... 318/799
6,316,904 B1 * 11/2001 Semenov et al. ............ 318/727
6,509,711 B1 * 1/2003 Zaremba ...................... 318/800
6,518,722 B1 * 2/2003 Giuseppe ..................... 318/727
6,528,966 B2 * 3/2003 Na .............................. 318/727
6,577,096 B2 * 6/2003 Cho ............................. 318/727
6,598,008 B2 * 7/2003 Lee ............................. 702/147
6,611,124 B2 * 8/2003 Ishida ......................... 318/727
6,683,428 B2 * 1/2004 Pavlov et al. ............... 318/432
6,713,978 B2 * 3/2004 Parlos et al. ................ 318/268

FOREIGN PATENT DOCUMENTS

| JP | 7-123798 A | 5/1995 |
|---|---|---|
| JP | 7-264898 A | 10/1995 |
| JP | 9-247999 A | 9/1997 |
| JP | 2001-86799 A | 3/2001 |

* cited by examiner

*Primary Examiner*—Rina Duda
*Assistant Examiner*—Eduardo Colon Santana
(74) *Attorney, Agent, or Firm*—Sughrue Mion, PLLC

(57) ABSTRACT

A magnetic flux estimator 7 of a controller used for sensor-less vector-controlling of an induction motor computes an estimated speed $\omega_{rest}$ and an estimated phase $\theta_{1est}$ from input $\alpha$-phase and $\beta$-phase voltage instructions $V_\alpha^*$, $V_\beta^*$ and $\alpha$-phase and $\beta$-phase currents $i_{s\alpha}$, $i_{s\beta}$. A speed corrector 8 receives these information items and determines a difference between a differential value output from a phase estimator and an additionally input slip angular speed; that is, a deviation $\omega'_{res}$. Further, a primary delay integral value is determined by subtracting a slip angular frequency $\omega_s$ from the deviation, and the primary delay integral value is multiplied by a correction gain, to thereby produce a correction to be made on the estimated speed $\omega_{rest}$. Thus, a more accurate estimated speed $\omega''_{rest}$ is obtained.

4 Claims, 1 Drawing Sheet

METHOD AND DEVICE FOR CORRECTING ESTIMATED SPEED OF INDUCTION MOTOR AND ITS DEVICE

FIELD OF THE INVENTION

The invention relates to a method and device for vector-controlling an induction motor, and more particularly, to a sensorless vector control method using the speed of a motor determined by a magnetic flux estimator and other information items, as well as to a sensorless vector control device.

BACKGROUND OF THE INVENTION

Implementation of a vector control method requires information about the speed and position of a motor. However, according to a sensorless vector control method, which is employed as a method for acquiring these information items, various information items are estimated without use of any sensors, but rather with use of a magnetic flux estimator.

A related-art induction motor magnetic flux estimator detects stator-side current for at least two phases (e.g., an U-phase current $i_{sU}(k)$ and a V-phase current $i_{sV}(k)$) and stator-side voltages for at least two phases (e.g., an U-phase voltage $V_{sU}(k)$ and a V-phase voltage $i_{sV}(k)$) from among an electric current supplied to an induction motor at a point in time of $k \cdot T_s$ second ("k" represents an integer showing a sequence of control steps, and $T_s$ represents the cycle of a control step). Through three-phase to two-phase conversion, the current and voltage are converted into coordinates on an α-β coordinate system of stationary coordinates commonly used for vector control, thereby computing an α-phase current $i_{s\alpha}(k)$, a β-phase current $i_{s\beta}(k)$, an α-phase voltage $V_\alpha(k)$, and a β-phase voltage $V_\beta(k)$, which are obtained at time $k \cdot T_s$ second.

A related-art example 1 relates to a magnetic flux estimator equation (1), a speed estimation equation (2), and a phase estimation equation (3), all being derived from an equation of state of an induction motor described in Transactions of the Institute of Electrical Engineers of Japan D, Vol. III, No. 11, pp. 954–960 (1991). Here, an estimated value is given a suffix "est," thereby indicating that the value is an estimated value.

$$\frac{d}{dt}\begin{bmatrix} i_{s\alpha est} \\ i_{s\beta est} \\ \phi_{r\alpha est} \\ \phi_{r\beta est} \end{bmatrix} = \begin{bmatrix} ar11 & 0 & ar12 & -ai12 \\ 0 & ar11 & ai12 & ar12 \\ ar21 & 0 & ar22 & -ai22 \\ 0 & ar21 & ai22 & ar22 \end{bmatrix} \begin{bmatrix} i_{s\alpha est} \\ i_{s\beta est} \\ \phi_{r\alpha est} \\ \phi_{r\beta est} \end{bmatrix} + \begin{bmatrix} \frac{1}{\sigma \cdot L_s} & 0 \\ 0 & \frac{1}{\sigma \cdot L_s} \\ 0 & 0 \\ 0 & 0 \end{bmatrix} \begin{bmatrix} V_\alpha \\ V_\beta \end{bmatrix} + \begin{bmatrix} g_1 & -g_2 \\ g_2 & g_1 \\ g_3 & -g_4 \\ g_4 & g_3 \end{bmatrix} \begin{bmatrix} i_{s\alpha} & -i_{s\alpha est} \\ i_{s\beta} & -i_{s\beta est} \end{bmatrix} \quad (1)$$

Here, $$ar11 = -\frac{R_s}{\sigma \cdot L_s} - \frac{1-\sigma}{\sigma \cdot \tau_r}, \quad ar12 = -\frac{1}{\rho} \cdot \frac{1}{\tau_r},$$

$$ai12 = \frac{1}{\rho} \cdot \omega_r \text{ or } \frac{1}{\rho} \cdot \omega_{rest}$$

$$ar21 = \frac{L_m}{\tau_r}, \quad ar22 = -\frac{1}{\tau_r}, \quad ai22 = \omega_r \text{ or } \omega_{rest}$$

$$\sigma = 1 - \frac{L_m^2}{L_s \cdot L_r}, \quad \tau_r = \frac{L_r}{R_r}, \quad \rho = -\frac{\sigma \cdot L_s \cdot L_r}{L_m}$$

$R_s$: resistance of a stator, $R_r$: resistance of a rotor; $L_m$: mutual conductance between the rotor and the stator, $L_s$: self-inductance of the stator, $L_r$: self-inductance of the rotor, $\omega_r$: speed, $\omega_{rest}$: estimated speed, $g_1, g_2, g_3, g_4$: observer feedback gain, $i_{s\alpha}$: α-phase stator current, $i_{s\beta}$: β-phase stator current, $V_\alpha$: α-phase stator voltage, $V_\beta$: β-phase stator voltage, $i_{s\alpha est}$: estimated α-phase stator current, $i_{s\beta est}$: estimated β-phase stator current, $\phi_{r\alpha est}$: estimated α-phase field magnetic flux for a rotor; $\phi_{r\beta est}$: estimated β-phase field magnetic flux for a rotor.

$$\omega_{rest} = k\omega_p[\phi_{r\beta est}(i_{s\alpha} - i_{s\alpha est}) - \phi_{r\alpha est}(i_{s\beta} - i_{s\beta est})] \quad (2)$$

$$\theta_{test} = \tan^{-1}(\phi_{r\beta est}/\phi_{r\alpha est}) \quad (3)$$

These equations are then developed into a sequential form.

$$\begin{bmatrix} i_{s\alpha est}(k+1) \\ i_{s\beta est}(k+1) \\ \phi_{r\alpha est}(k+1) \\ \phi_{r\beta est}(k+1) \end{bmatrix} = \begin{bmatrix} 1+ar11 \cdot T_s & 0 & ar12 \cdot T_s & -ai12 \cdot T_s \\ 0 & 1+ar11 \cdot T_s & ai12 \cdot T_s & ar12 \cdot T_s \\ ar21 \cdot T_s & 0 & 1+ar22 & -ai22 \cdot T_s \\ 0 & ar21 \cdot T_s & ai22 \cdot T_s & 1+ar22 \cdot T_s \end{bmatrix} \quad (4)$$

$$\begin{bmatrix} i_{s\alpha est}(k) \\ i_{s\beta est}(k) \\ \phi_{r\alpha est}(k) \\ \phi_{r\beta est}(k) \end{bmatrix} + \begin{bmatrix} \frac{1}{\sigma \cdot L_s} \cdot T_s & 0 \\ 0 & \frac{1}{\sigma \cdot L_s} \cdot T_s \\ 0 & 0 \\ 0 & 0 \end{bmatrix} \begin{bmatrix} V_\alpha(k) \\ V_\beta(k) \end{bmatrix} +$$

$$\begin{bmatrix} g_1 \cdot T_s & -g_2 \cdot T_s \\ g_2 \cdot T_s & g_1 \cdot T_s \\ g_3 \cdot T_s & -g_4 \cdot T_s \\ g_4 \cdot T_s & g_3 \cdot t_s \end{bmatrix} \begin{bmatrix} i_{s\alpha}(k) - i_{s\alpha est}(k) \\ i_{s\beta}(k) - i_{s\beta est}(k) \end{bmatrix}$$

$$\omega_{rest}(k) = k_{\omega p}[\phi_{r\beta est}(k)\{i_{s\alpha}(k) - i_{s\alpha est}(k)\} - \quad (5)$$
$$\phi_{r\alpha est}(k)\{i_{s\beta}(k) - i_{s\beta est}(k)\}] +$$
$$k_{\omega i} \cdot T_s \sum_{i=0}^{k} [\phi_{r\beta est}(i)\{i_{s\alpha}(i) - i_{s\alpha est}(i)\} -$$
$$\phi_{r\alpha est}(i)\{i_{s\beta}(i) - i_{s\beta est}(i)\}]$$

$$\theta_{lest} = \tan^{-1}(\phi_{r\beta est}(k)/\phi_{rest}(k)) \quad (6)$$

Through use of an observer for an induction motor control circuit which operates in accordance with the above equations, an estimated value of a control step (k+1) is computed from an estimated value or the like of the control step "k." Specifically, an estimated error between an α-phase estimated current $i_{s\alpha est}(k)$, which is estimated by a control loop of the control step "k" at a time of k·$T_s$ second, and an α-phase current $i_{s\alpha}(k)$; that is, $i_{s\alpha}(k)-i_{s\alpha est}(k)$, and an estimated error between a β-phase estimated current $i_{s\beta est}(k)$, which is estimated by the control loop of the control step "k" at a time of k·$T_s$ second, and a β-phase current $i_{s\beta}(k)$; that is, $i_{s\beta}(k)-i_{s\beta est}(k)$, are used for computing estimated values $i_{s\alpha est}(k+1)$, $i_{s\beta est}(k+1)$, $\phi_{r\alpha est}(k+1)$, $\phi_{r\beta est}(k+1)$ at a time of (k+1)·$T_s$ seconds.

As mentioned above, the related-art example 1 requires a voltage sensor to be used for using the stator-side voltages $V_\alpha$, $V_\beta$.

Next, a speed sensorless vector control method for an induction motor described in JP-A-7-123798, employed as a related-art 2, is intended for preventing occurrence of impediments to vector control resulting from a "lag" stemming from a course for estimating an actual speed of the induction motor. An actual speed of the induction motor is estimated by means of an identical dimension magnetic flux observer and a speed-adaptive secondary magnetic flux observer formed from a speed-adaptive mechanism. By means of a comparison error signal stemming from comparison between the actual estimated speed and an instruction speed, the current control section is controlled, thereby performing vector control operation. An estimated secondary magnetic flux of the motor determined by the same dimension magnetic flux observer is integrated, thereby determining a corrected slip angular frequency for the motor. Thus, the slip angular frequency instruction value to be used for controlling the current control section is corrected.

A strong desire exists for the related-art induction motor magnetic flux estimator from which the voltage sensor seen in the related-art example 1 is obviated for the sake of cost reduction. As in the case of the related-art 2, a method conceived as one method for implementing cost cutting is to use an α-phase instruction voltage $V_\alpha"(k)$ and a β-phase instruction voltage $V_\beta"(k)$ instead of an α-phase measured voltage $V_\alpha(k)$ and a β-phase measured voltage $V_\beta(k)$. However, in this case, an error sometimes exists between the voltage instruction value and the actual value. This leads to a problem of occurrence of an error in estimated rotor interlinkage magnetic fluxes $\phi_{r\alpha est}$, $\phi_{r\beta est}$ and an estimated speed $\omega_{rest}$.

To this end, the invention is aimed at providing a method and device for correcting an estimated speed of a so-called speed sensorless induction motor which can solve drawbacks of the related-art example and does not have any speed sensor capable of accurately estimating a speed.

SUMMARY OF THE INVENTION

To achieve the object, according to the invention, an estimated speed $\omega'_{rest}$ is determined through use of an estimated phase $\theta_{lest}$, which is determined by a related-art magnetic flux estimator, and a slip angular speed $\omega_s$, according to the following equation.

$$\omega'_{rest} = \frac{d}{dt}\theta_{lest} - \omega_s \quad (7)$$

Even if a steady estimated error exists between the estimated phase $\theta_{lest}$ and an actual phase $\theta_1$, the steady error will be deleted by differentiation. Hence, as in the case of Equation (7), the value $\omega'_{rest}$—which is determined by differentiating the estimated phase $\theta_{lest}$, to thereby determined a primary angular speed, and subtracting the slip angular speed $\omega_s$ from the primary angular speed—corresponds to an accurately estimated speed of the motor. By utilization of this relation, the estimated value is subjected to additional amendment provided below.

$$\omega''_{rest} = \omega_{rest} - \frac{k_p}{1+s \cdot T_s} \cdot (\omega_{rest} - \omega'_{rest}) \quad (8)$$

$k_p$: corrected gain, $T_s$: first-order lag time constant

Here, $\omega''_{rest}$ coincides with actual speed $\omega_r(k)$.

In more detail, in order to correct a displacement of the estimated speed $\omega_{rest}$ resulting from an error of an input voltage or an error of integer computation, there is determined a difference between an estimated speed $\omega_{rest}$ and a speed $\omega'_{rest}$, wherein the speed $\omega'_{rest}$ is determined from a difference between a differential value of an estimated phase $\theta_{lest}$ computed, according to Equation (6), from estimated rotor interlinkage magnetic fluxes $\Phi_{r\alpha est}$, $\Phi_{r\beta est}$ estimated by a magnetic flux estimator and a rotational angular speed $\omega_s$ determined through slip frequency computation. In order to suppress occurrence of a transient change, the difference is then subjected to integration performed by a primary delay integrator, whereby the estimated speed $\omega''_{rest}$ determined by Equation (8) is determined from the difference between the estimated speed $\omega_{rest}$ and the speed.

BEST MODE FOR IMPLEMETING THE INVENTION

Figure 1:
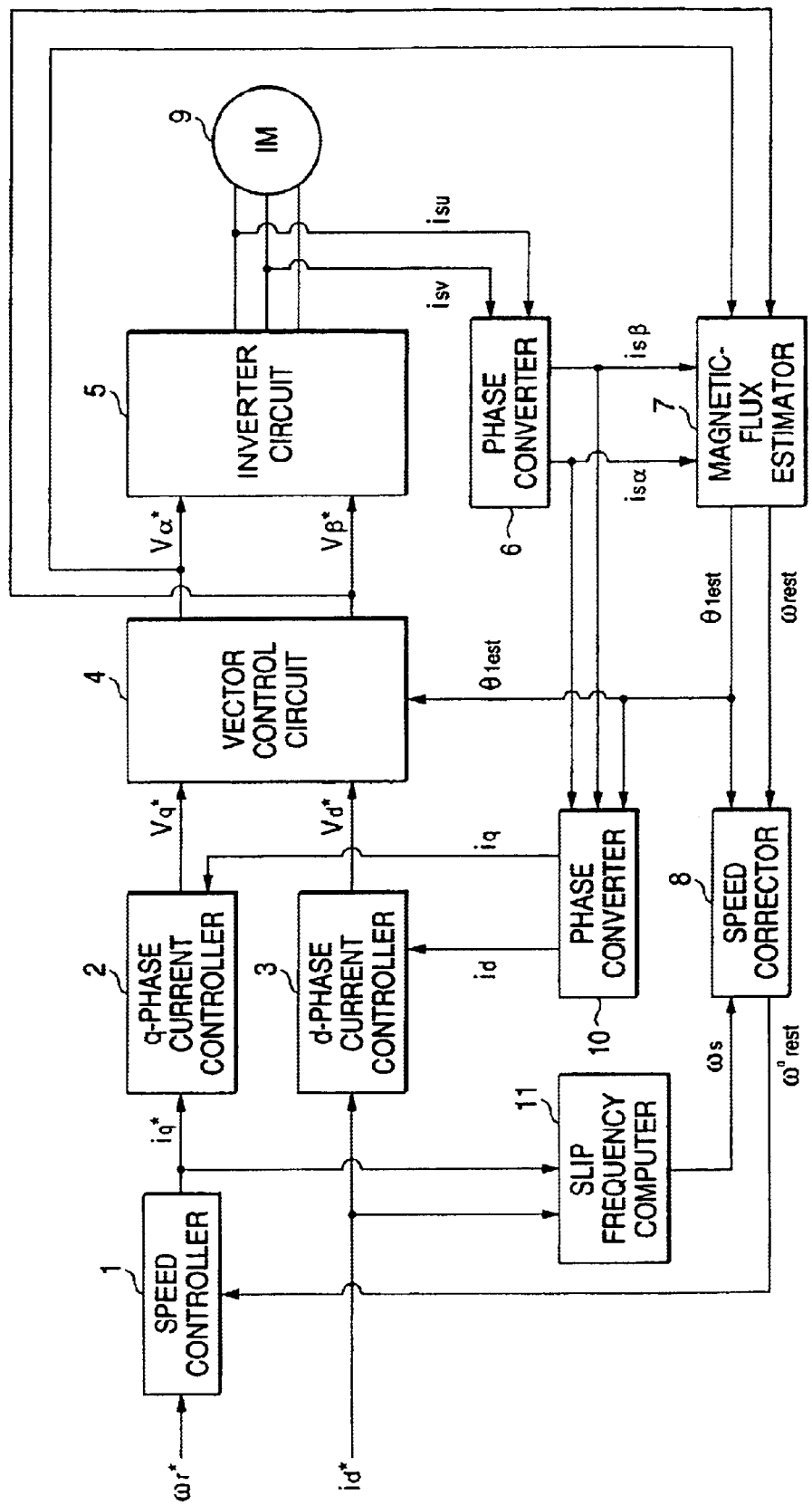
FIG. 1 is a block diagram showing the functional configuration of an exemplary control system of an induction motor to which is applied an embodiment of a method for correcting an estimated speed of an induction motor according to the invention.

An embodiment of the invention will now be described by reference to the drawing.

FIG. 1 is a block diagram showing the functional configuration of an exemplary control system of an induction motor to which is applied an embodiment of a method for correcting an estimated speed of magnetic flux of an induction motor according to the invention.

The configuration and operation of the control system will be described by reference to the block diagram of FIG. 1. Here, a coordinate system of a stator of a motor is taken as an $\alpha$-$\beta$ static coordinate system. A coordinate system, which rotates at the same angular speed as that of a primary magnetic field, is taken as a d-q rotary coordinate system.

A speed instruction $\omega^*_r$ from the outside and an estimated speed $\omega''_{rest}$ from a speed corrector 8 to be described later are input to a speed controller 1. According to the following equation, the speed controller 1 computes and outputs a q-phase current instruction $i^*_q$ of a rotary coordinate system.

$$i^*_q = k_1 \cdot (\omega^*_r - \omega''_{rest}) + \frac{k_1}{T_1} \int (\omega^*_r - \omega''_{rest}) dt$$

$k_1$: proportional gain, $T_1$: integral time The value $i^*_q$ and a q-phase current value $i_q$ output from a phase converter 10 are input to a q-phase current controller 2. According to the following equation, the q-phase current controller computes and outputs a q-phase voltage instruction $V^*_q$.

$$V^*_q = k_2 \cdot (i^*_q - i_q) + \frac{k_2}{T_2} \int (i^*_q - i_q) dt$$

$k_2$: proportional gain, $T_2$: integral time A d-phase current instruction $i^*_d$ of the rotary coordinate system from the outside and a d-phase current id output from the phase converter 10 are input to a d-phase current controller 3. The d-phase current controller 3 outputs a d-phase voltage instruction $V^*_d$ according to the following equation.

$$V^*_d = k_3 \cdot (i^*_d - i_d) + \frac{k_3}{T_3} \int (i^*_d - i_d) dt$$

$k_3$: proportional gain, $T_3$: integral time Here, voltage instructions $v^*_q$, $v^*_d$ are input to a vector control circuit 4.

The vector control circuit 4 converts the voltage instructions $v^*_q$, $v^*_d$ into an $\alpha$-phase voltage instruction $v^*_\alpha$ and a $\beta$-phase voltage instruction $v^*_\beta$ of the static coordinate system through use of the following equation and by means of the phase $\theta_{lest}$ input by way of a magnetic flux estimator 7, thereby outputting the thus-converted voltage instructions.

$$\begin{pmatrix} V^*_\alpha \\ V^*_\beta \end{pmatrix} = \begin{pmatrix} \cos\beta_{lest} & -\sin\theta_{lest} \\ \sin\theta_{lest} & \cos\theta_{lest} \end{pmatrix} \begin{pmatrix} V^*_d \\ V^*_q \end{pmatrix}$$

On the basis of these voltage instruction $v^*_\alpha$, $v^*_\beta$, an inverter circuit 5 drives an induction motor 9. A U-phase current $i_{sV}$ and a V-phase current $_{sV}$ of the induction motor are input to a phase converter 6, where the currents are converted into an $\alpha$-phase current $i_{s\alpha}$ and a $\beta$-phase current $i_{s\beta}$ of the static coordinate system through use of the following equation.

$$\begin{pmatrix} i_{s\alpha} \\ i_{s\beta} \end{pmatrix} = \begin{pmatrix} 1 & 0 \\ \frac{1}{\sqrt{3}} & \frac{2}{\sqrt{3}} \end{pmatrix} \begin{pmatrix} i_{su} \\ i_{sv} \end{pmatrix}$$

The $\alpha$-phase current $i_{s\alpha}$, the $\beta$-phase current $i_{s\beta}$, the voltage instructions $v_\alpha^*$, $v_\beta^*$ are input to the magnetic flux estimator 7, and an $\alpha$-phase estimated current $i_{s\alpha est}$, a $\beta$-phase estimated current $i_{s\beta est}$ (both not shown), an estimated rotor interlinkage magnetic flux $\phi_{r\alpha est}$, an estimated rotor interlinkage magnetic flux $\phi_{r\beta est}$ (both not shown), an estimated speed $\omega_{rest}$, and an estimated phase $\theta_{lest}$ are output. Specifically, the magnetic flux estimator 7 incorporates Equations (1) through (3). By means of the equations, the magnetic flux estimator performs computation of information items. A phase converter 10 converts the $\alpha$-phase current $i_{s\alpha}$ and the $\beta$-phase current $i_{s\beta}$ through use of an estimated phase $\theta_{lest}$ according to the following equation, thereby outputting d-phase and q-phase current values $i_d$, $i_q$.

$$\begin{pmatrix} i_d \\ i_q \end{pmatrix} = \begin{pmatrix} \cos\theta_{lest} & \sin\theta_{lest} \\ -\sin\theta_{lest} & \cos\theta_{lest} \end{pmatrix} \begin{pmatrix} i_{s\alpha} \\ i_{s\beta} \end{pmatrix}$$

The configuration and operation of each of the constituent elements are known as related-art sensorless vector control. In the embodiment, the estimated speed $\omega_{rest}$ output from the magnetic flux estimator 7 is corrected through use of an additional speed corrector 8 and an additional slip frequency computer 11, thereby supplying a correct estimated speed $\omega''_{rest}$ to the speed controller 1.

$$\omega_s = k_4 \cdot \frac{i_q}{i_d}$$

$k_4$: conversion factor

Specifically, the d-phase and q-phase current instructions $i_{d^*}$, $i_{q^*}$ are input to the slip frequency computer 11, where a slip angular speed $\omega_s$ is computed and output. The estimated speed $\omega_{rest}$ and the estimated phase $\theta_{lest}$, which are output from the magnetic flux estimator 7, and the slip angular speed $\omega_s$ output from the slip frequency computer 11 are input to the speed corrector 8. By use of the foregoing incorporated Equations (7), (8), the corrector makes corrections to the input speed estimate $\omega_{rest}$, thereby computing a more accurate estimated speed $\omega''$.

In the embodiment, even when an error has arisen in the estimated speed $\omega_{rest}$, the accuracy of speed and torque of the motor can be held more accurately through correction.

Industrial Applicability

As mentioned above, according to the invention, corrections are made to an estimated speed of an induction motor which is computed and output by means of a magnetic flux estimator used for related-art sensorless vector control, through use of predetermined computation formulae, whereby a correct estimated speed is obtained at all times even if an error arises in the estimated speed. The accuracy of speed and torque of the induction motor can be enhanced.

What is claimed is:

1. A method for sensorless vector-controlling the speed of an induction motor through use of a magnetic flux estimator, the estimator estimating an estimated current, an estimated secondary-side interlinkage magnetic flux, an estimated speed, and an estimated phase, by detecting stator-side currents for at least two phases of an electric current supplied to the induction motor and receiving input of α-phase and β-phase currents converted into an α-β coordinate system of static coordinate system and a voltage instruction value converted into the α-β coordinate system, wherein a corrected speed estimate is obtained by subtracting a slip angular speed from a differential value of estimated phase, multiplying a resultant deviation of estimated speed by a predetermined correction coefficient, and adding a resultant amount of correction to the estimated speed.

2. The method for sensorless vector-controlling the speed of an induction motor according to claim 1, wherein the deviation is represented by the following equation $$\omega'_{rest} = \frac{d}{dt}\theta_{lest} - \omega_s$$

where $\omega'_{res}$: a deviation, $\theta_{lest}$: an estimated phase, $\omega_s$: a slip angular speed, and the corrected speed estimate is represented by the following equation $$\omega''_{rest} = \omega_{rest} - \frac{k_p}{1+s \cdot T_s} \cdot (\omega_{rest} - \omega'_{rest})$$

where $k_p$: a corrected gain, $T_s$: a primary delay time constant, $\omega_{rest}$: an estimated speed, and $\omega''_{rest}$: a corrected speed estimate.

3. A device for sensorless vector-controlling the speed of an induction motor through use of a magnetic flux estimator, the estimator estimating an estimated current, an estimated secondary-side interlinkage magnetic flux, an estimated speed, and an estimated phase, by detecting stator-side currents for at least two phases of an electric current supplied to the induction motor and receiving input of α-phase and β-phase currents converted into an α-β coordinate system of static coordinate system and a voltage instruction value converted into the α-β coordinate system, wherein a corrected speed estimate is obtained by subtracting a slip angular speed from a differential value of estimated phase, multiplying a resultant deviation of estimated speed by a predetermined correction coefficient, and adding a resultant amount of correction to the estimated speed.

4. The device for sensorless vector-controlling the speed of an induction motor according to claim 3, wherein the deviation is represented by the following equation $$\omega'_{rest} = \frac{d}{dt}\theta_{lest} - \omega_s$$

where $\omega'_{res}$: a deviation, $\theta_{lest}$: an estimated phase, $\omega_s$: a slip angular speed, and the corrected speed estimate is represented by the following equation $$\omega''_{rest} = \omega_{rest} - \frac{k_p}{1+s \cdot T_s} \cdot (\omega_{rest} - \omega'_{rest})$$

where $k_p$: a corrected gain, $T_s$: a primary delay time constant, $\omega_{rest}$: an estimated speed, and $\omega''_{rest}$: a corrected speed estimate.

* * * * *